Sheet 1 - 2 Sheets.
J. C. Gould,
Making Cut Nails,
No. 2,301.
Reissued July 10, 1866.
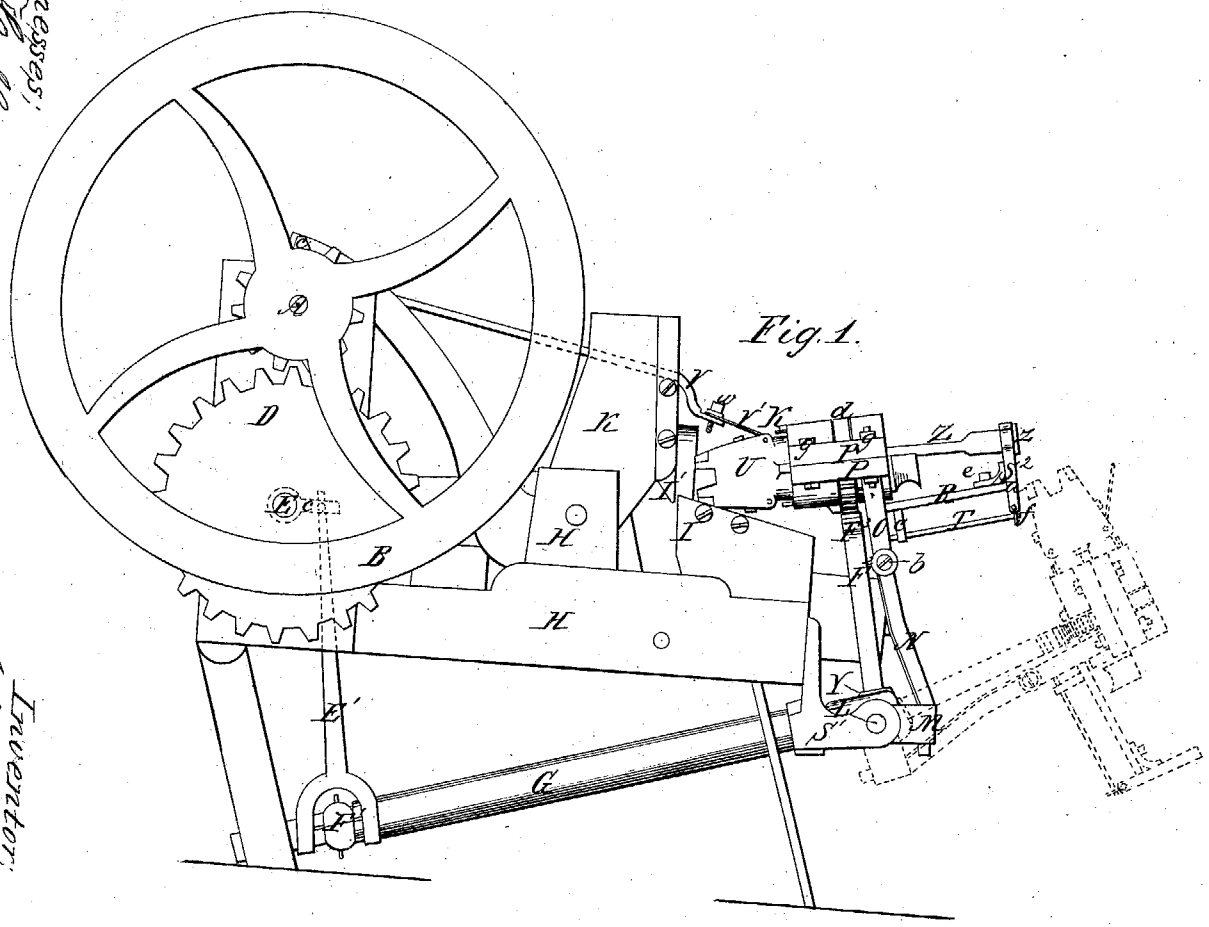
Witnesses;
W. F. Hall
John A. Wiedersheim
Inventor;
John C. Gould,
By Munn & Co
Attorneys
N. PETERS, PHOTO-LITHOGRAPHER, WASHINGTON, D. C.

Sheet 2 - 2 Sheets.
J. C. Gould,
Making Cut Nails,
No. 2,301. Reissued July 10, 1866.
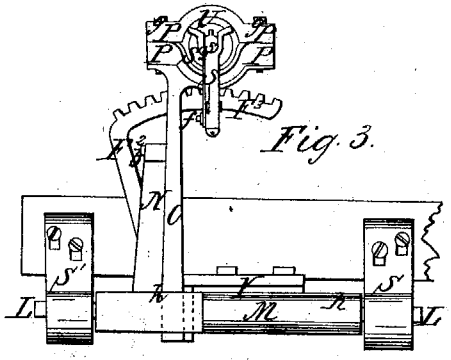
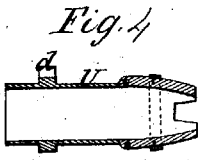
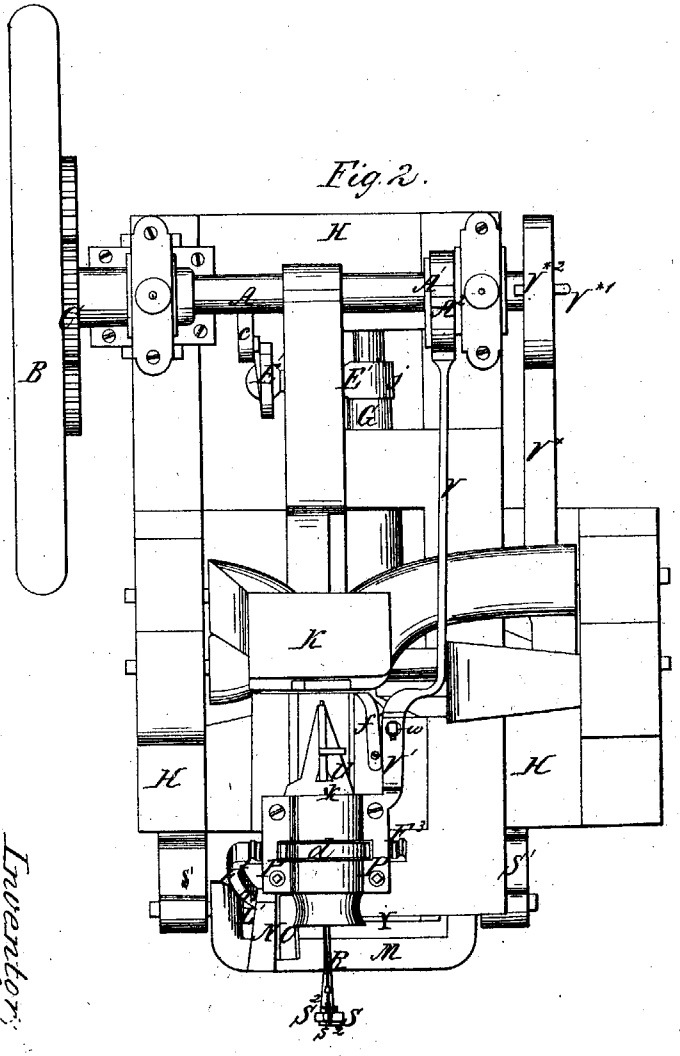
Witnesses;
W. F. Hall
John A. Quedensheim
Inventor;
John C. Gould
By Munn & Co
Attorneys
N. PETERS, PHOTO-LITHOGRAPHER, WASHINGTON, D. C.

UNITED STATES PATENT OFFICE.

JOHN C. GOULD, OF BOONTON, NEW JERSEY.

IMPROVEMENT IN NAIL-PLATE-FEEDING MACHINES.

Specification forming part of Letters Patent No. 17,273, dated May 12, 1857; Reissue No. 2,301, dated July 10, 1866.

*To all whom it may concern:*

Be it known that I, JOHN C. GOULD, of Boonton, in the county of Morris and State of New Jersey, have invented a new and Improved Mode of Feeding Nail-Machines; and I do hereby declare the following to be a full, clear, and exact description of the nature, construction, and operation of the same, reference being had to the accompanying drawings, which are made part of this specification, and in which—

Figure 1 is a side elevation of the machine. Fig. 2 is a plan or top view. Fig. 3 is an end view, showing the part simmediately involved in the feeding. Fig. 4 is a central longitudinal section of the nose-piece.

The same letters refer to corresponding parts in the different figures.

My invention has reference to the method of feeding the nail-plate to the cutters; and it consists, first, in the devices for advancing the nail-plate to the cutters; second, in the devices for operating the nose-piece through which the material is supplied to the cutters; third, in so hinging the carriage or supporting-frame of the feeding nose-piece and connecting the same with the shaft which gives its vibratory movement as to adapt said nose-piece and the devices employed in immediate connection therewith to be turned back away from the cutters to render them more readily accessible.

In order that others skilled in the art to which my invention appertains may be enabled to fully understand and use the same, I will proceed to describe its construction and operation in detail with reference to the accompanying drawings.

Devices for heading the nails as they pass from the cutters are represented as combined in the same machine as my improvements; but as they form no part of this invention they will not be further alluded to.

A is a shaft, upon which may be fixed a pulley to receive a belt, through which motion may be transmitted to the nail feeding and cutting devices from a suitable prime motor. B is a fly-wheel mounted upon one end of the shaft A, which for the sake of distinction and by reason of its function will be called the "driving-shaft." C is a cog-wheel, keyed upon the driving-shaft and gearing with another cog-wheel D, keyed upon a shaft, E.

The shaft E has its bearing in the lower end of one of the uprights F F, which rise from the main frame H H, and which support the driving-shaft at its two ends. The inner end of the shaft E carries a crank, *c*, which is connected by a wrist-pin to the pitman E′, the lower forked end of which is connected by a ball-joint with an arm, F′, which is formed with a tubular hub or head, *j*, which is made fast to the rock-shaft G, to adapt the arm F′ to impart motion thereto. On the opposite end of the rock-shaft G, near which it has a suitable bearing, is fixed and supported a box, L′, which is vibrated in a vertical plane as the shaft G rocks.

In the box L′ is journaled a short rock-shaft, Y, which, while it partakes of the vibration of the box L′, is adapted to rock or turn upon its axis within the box, which allows it to conform to the movements traced in the course of the following description.

$F^2$ is a bent metallic bar, the lower horizontal portion of which is made fast to the rock-shaft Y. The upper horizontal portion of the bar $F^2$ constitutes a segmental rack, $F^3$. The bar $F^2$ is vibrated with the shaft Y, and the rack $F^3$, gearing with a cogged rim, *d*, on the tubular nose-piece U, communicates a rotating reciprocatory movement to the latter.

The nose-piece U is tubular or hollow throughout, and for the greater portion of its length it is cylindrical, in order that it may turn freely within its bearing or box P, which is composed of two parts bolted together and thus fastened around the nose-piece, as represented. The inner end of the nose-piece is contracted so as to be adapted to turn the nail-plate, which is placed in the nose-piece to be fed to the cutters. A pin, *k*, on the bearing P serves as a stop to insure a positive limit to the rotary movement of the nose-piece.

O is an upright metallic support, on the upper end of which rests the journal-box P and rotating nose-piece U. The support O is attached to a shaft, M, which is pivoted in the lugs or bearings S′ S′, which are adjustable vertically on the framing H. From the pivoted shaft M also rises an arm, N, having a set-screw, *b*, for pressing laterally the rear end of the nose-piece to change the size of the head.

The principal function of the nose-piece is to hold the plate or material in position while it is being acted upon by the cutters I I′. The cutter I is stationary; but the cutter I′, which is fixed in the pivoted cutter-head K, is moved up and down through the medium of the arm V*, pitman V*′, and crank-wheel V*², the latter being mounted upon one end of the driving-shaft A. On the driving-shaft A is also fixed or formed a cam, A′, over which is fitted a collar, A², to which is connected a rod, V, the latter being attached to a rod, V′, projecting from the journal-box P of the nose-piece U. The cam A′ moves the rods V V′ back and forth as the shaft A rotates, and the nose-piece with its appendages are thus carried toward and away from the cutters I I′.

The rods V V′ are connected together by means of a set-screw, *w*, by loosening which the two rods can be readily disconnected, to facilitate which the end of the rod V′ is slotted so that it may readily liberate itself in a longitudinal direction when not clamped to the rod V by the screw *w*. By thus disconnecting the rods V V′ from each other the nose-piece U with its appendages can be turned back with or upon the hinged or pivoted shaft M, so as to be out of the way of the cutters I I′, which it may be desired to render accessible in order to sharpen, replace, or adjust them.

The shaft Y being free to rotate, and its axis being in line or at least parallel with that on which the shaft M vibrates, the connection between the rack F³ and cogged rim *d* is not broken when the nose-piece U is turned back out of the way of the cutters. This adaptability of the parts is known to be of considerable importance by persons familiar with the operation of this class of machines, for the manipulation of the knives is of frequent occurrence and attended with difficulty in machines in which the retaining or feeding devices are immovable.

R represents a horizontal arm bolted to the under side of the upper horizontal portion of the support O, and projecting backward from the nose-piece U, in the manner represented.

S S² is the device for feeding the nail-plate, which is grasped by the nipper-rod Z, and by means of the latter introduced into the nose-piece U. The rear end of the nipper-rod rests in the recess *s* in the top of the feeding device, the part S of which is a lever pivoted to the end of the arm R, while the part S² is a spring attached to the lever S by a screw, *f*. It will be seen that the rear end of the nipper-rod, being thus permitted to rest in the recess between the spring and lever of the vibrating feeding device, and being flat in form, is tightly clamped between the lever S and spring S², when it is turned by the rotation of the nose-piece and pushed forward to feed the nail-plate; then, when the nose-piece has ceased to turn and assumed its original position, the nipper-rod stands up edgewise within the recess *s*, and is released from the grasp of the spring. Hence, as the nose-piece does not rotate during its backward movement, and as the movement imparted to the nipper-rod depends upon the rotation of the nose-piece, the nail-plate, together with the nipper-rod, remain stationary during said backward movement.

The movement of the nipper-rod to effect the feeding of the nail-plate, as above described, is caused by a rod, T, and spring *a*. The rod T, coming in contact with the framing of the machine as the nose-piece is advanced, turns the feeding device S S² upon its pivot, throwing its lower end backward and its upper end forward. As soon as the nose-piece U commences its backward movement the opening-spring *a* acts to throw back the upper end of the feeding device.

*e* is a stop upon the arm R for limiting the vibratory movement of the feeding device.

On the rear extremity of the nipper-rod is a ring or disk, *z*, which, by coming in contact with the feeding device, prevents the said rod from further advancement after the nail-plate is exhausted. This saves the rod from the injury it would receive if carried forward to the cutters. The ring or disk *z* may be adjusted as occasion may render desirable.

It is manifest that, inasmuch as the support O vibrates in the arc of a circle, its top is at a lower point when the nose-piece *u* is advanced than when the latter is retracted, so that in the act of retracting the nose-piece the support O raises the same out of contact with the stationary cutter, and so permits the said nose-piece to be rotated freely.

*f′* is a guide on the bed, near the side of the nose-piece where the nail-head is, which causes a uniformity in the heading, for if the plate is a fraction wider here than at other points the head end rests against the guide and presses open the spring on the other side and so, when the nose-piece is rotated, the spring will open on the other side.

Having thus described my invention, the following is what I claim as new and desire to secure by Letters Patent:

1. The feed or nipper rod *z* and the feeding device S S′, in combination with the rod T and nose-piece U, as and for the purposes specified.

2. Fixing the bar F² on which the rack F³ is formed upon a shaft, Y, journaled within and supported by a vibrating box or bearing, L′, substantially as and for the purpose set forth.

3. Supporting the nose-piece and feeding devices upon a hinged or pivoted shaft, M, to adapt them to be turned back to render the cutters accessible, as described.

4. Connecting the nose-piece with the driving-shaft by means of the two rods V V′, adapted to be disconnected, as described, to admit of the turning back of the nose-piece.

5. The combination of the rock-shaft G, vibrating box L′, rock-shaft Y, bar F², cogged rim *d*, and nose-piece U, substantially as and for the purpose specified.

JOHN C. GOULD.

Witnesses:
W. G. WIGGINS,
JOHN C. GRENE.